Dec. 19, 1933.  A. S. HOWELL  1,940,130
STOP MECHANISM
Filed April 4, 1929  3 Sheets-Sheet 1

Dec. 19, 1933.  A. S. HOWELL  1,940,130
STOP MECHANISM
Filed April 4, 1929   3 Sheets-Sheet 2

Inventor.
Albert S. Howell
By:- Miehle & Miehle
Atty's.

Dec. 19, 1933.    A. S. HOWELL    1,940,130
STOP MECHANISM
Filed April 4, 1929    3 Sheets-Sheet 3
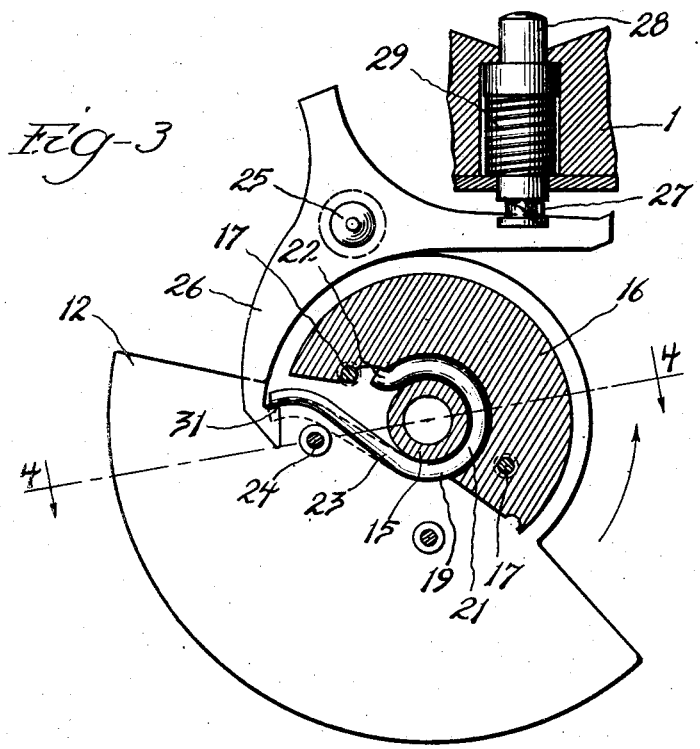
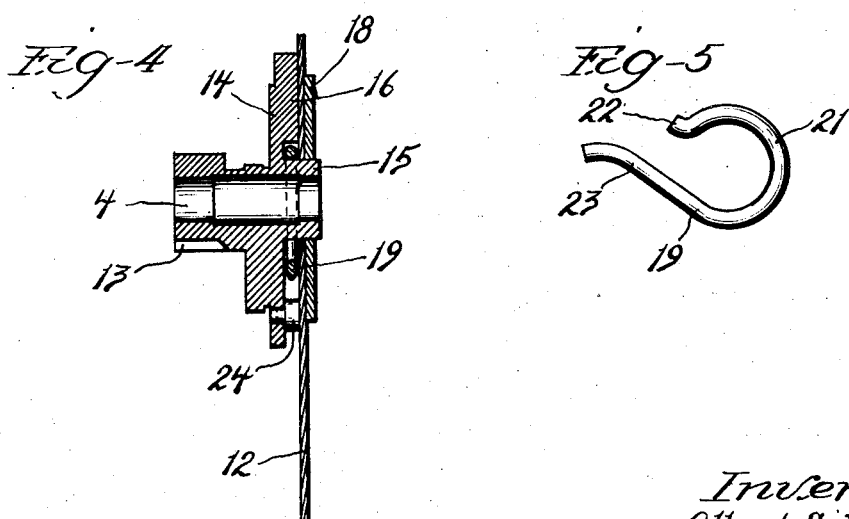
Inventor
Albert S. Howell
By:- Miehle & Miehle.
Atty's.

Patented Dec. 19, 1933

1,940,130

UNITED STATES PATENT OFFICE 1,940,130

STOP MECHANISM

Albert S. Howell, Chicago, Ill., assignor to The Bell & Howell Company, Chicago, Ill., a corporation of Illinois Application April 4, 1929. Serial No. 352,391

6 Claims. (Cl. 192—139)

My invention relates particularly to stop mechanism for controlling the operation of spring driven motion picture cameras although not limited to this use alone.

The main feature of my invention relates to the provision of a stop mechanism of the positive type with a view toward effecting a quick stop of the mechanism controlled thereby without undue strain, and particularly with a view toward the embodiment of the same in a certain well known type of spring driven motion picture camera.

The invention will be better understood by reference to the accompanying drawings in which—

Figure 3 is a partial sectional view;

Figure 4 is a partial section on the line 4—4 of Figure 3; and

Figure 5 is a face view of the spring stop member of the mechanism, hereinafter described.

Like characters of reference indicate like parts in the several views.

Figure 1:
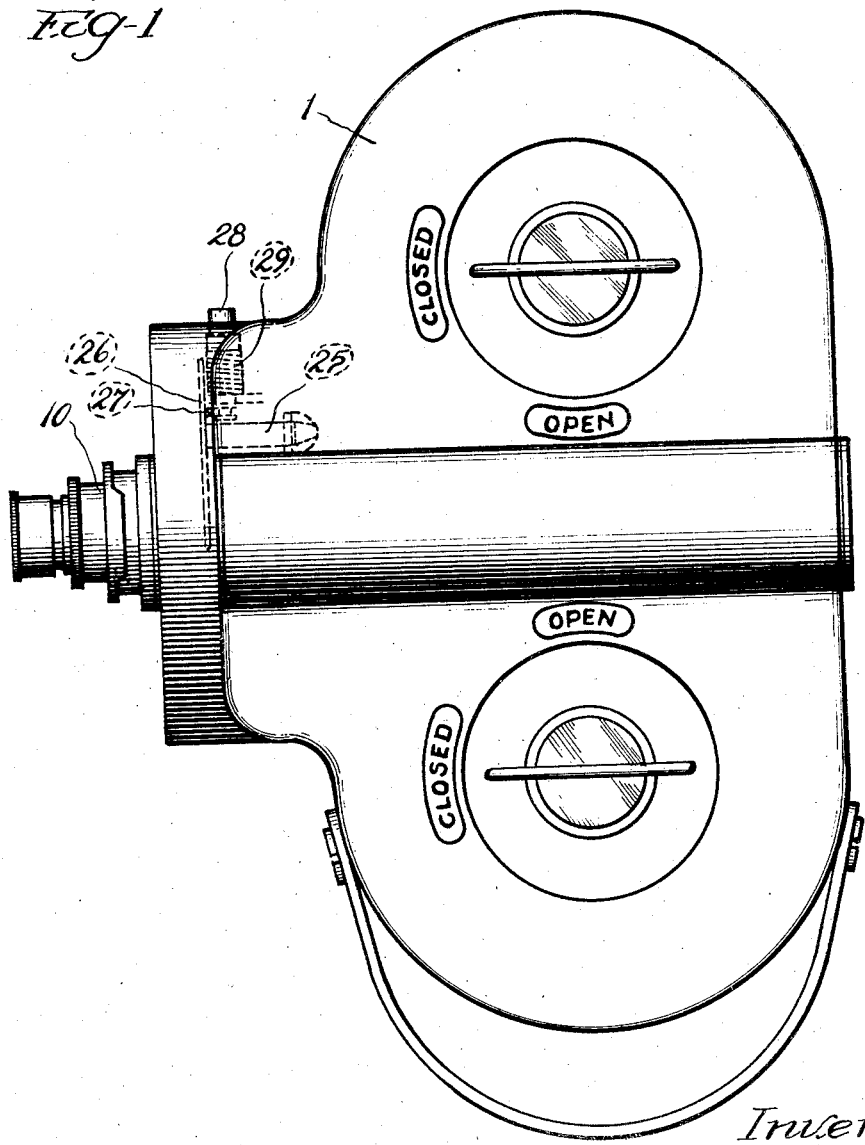
Figure 1 is a side elevation of the aforementioned motion picture camera embodying my invention.
Figure 2:
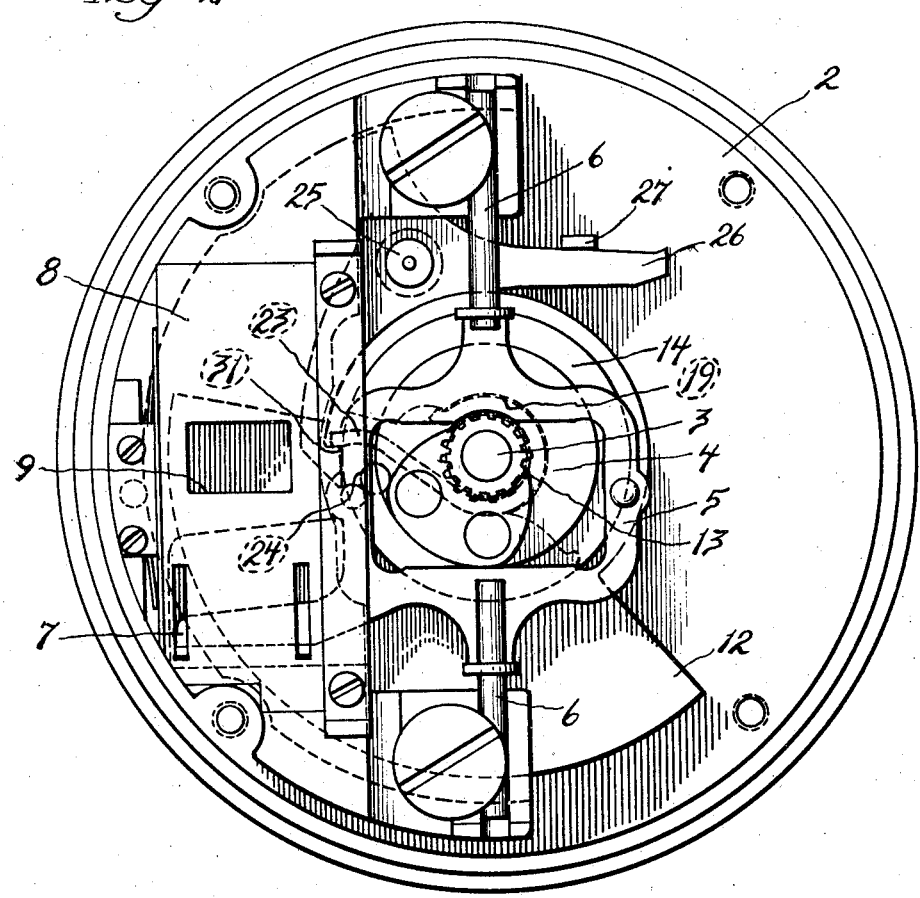
Figure 2 is an enlarged interior view of a portion of the same.

In the said drawings, 1 designates generally an enclosure, the front end of which is formed by a detachable front piece 2 upon which is mounted a stud 3 projecting rearwardly within the casing from the front piece. See Figures 1 and 2.

Revolubly mounted upon the stud 3 is a bored cam member 4 which operates upon a shuttle 5, mounted on spaced and alined studs 6 on the rear of the front piece, to effect intermittent film feeding movement of a laterally projecting toothed arm 7 of the shuttle for intermittently feeding a film through the exposure guide of the camera, which guide is inclusive of a front film face guide plate 8 provided with an exposure aperture 9 alined with a photographic lens 10 of the camera. See Figures 1 and 2.

A segmental exposure shutter 12, secured on the cam member 4 in a manner hereinafter described, sweeps in front of the exposure aperture 9 for interrupting the exposure light during movement of the film in the guide. See Figure 2.

The rear end of the cam member 4 is provided with a gear pinion 13 which meshes with gearing not shown, for the driving of the cam member, said gearing being driven by a spring motor, also not shown, which together with said gearing is enclosed within the casing.

The cam member 4 is provided with a forwardly disposed disk portion 14 which is cut away at the front face thereof to form a central hub 15 and a segmental portion 16 extending about and adjacently spaced from said hub, the said hub 15 extending forwardly of the plane of the front face of said disk portion. See Figures 3 and 4.

The exposure shutter 12 is centrally apertured and is engaged on the hub 15 and is secured with the cam member at the front face of the disk portion 14 by means of rivets 17 passing through registering apertures in the disk portion, shutter, and a washer 18, in front of the shutter and engaged on the hub 15, and securing the same together.

A spring member 19 is disposed in the space afforded by the cut away portion of the disk portion 14 and has the inner portion 21 thereof coiled about the hub 15 and disposed between this hub and the segmental portion 16. See Figures 3, 4 and 5. The inner end of the spring member 19 is turned radially outward, as designated at 22, and angularly engages the segmental portion 16 of the disk portion 14.

The outer portion of the spring member 19, designated at 23, extends radially outward from the inner portion 21, and an abutment stud 24 is mounted on the disk portion 14 and extends across the space afforded by the cut away portion of the disk portion 14 and is engageable with the outer portion 23 of the spring member 19 for maintaining an initial tension on the spring member, as shown in broken lines in Figure 3.

Intermediately pivoted, by means of a stud 25 on an axis parallel to that of the cam member 4, is a lever 26 which lies in the plane of the spring member 19. See Figures 1 and 3. One arm of this lever is provided with a rearwardly projecting lug 27 which is engaged in a circumferential groove on the lower end of a control plunger 28 which projects through a bore through the casing 1 and has its upper end projecting exteriorly thereof for manual manipulation. The plunger 28 is yieldably urged upwardly, as shown in Figure 3, by means of a spring 29.

The other end of the lever 26 is provided with a hook formation 31 which is adapted to angularly engage the outer end of the spring member 19, as shown in full lines in Figure 3, when the control plunger 28 is in its upper position, to stop rotation of the cam member 4.

When the control plunger 28 is manually depressed, against the influence of the spring 29, the hook formation 31 disengages from the spring member 19 to permit rotation of the cam member 4 and consequent operation of the camera mechanism.

When not engaged with the hook formation 31 the outer portion 23 of the spring member 19 has an initial tension against the abutment stud 24, as shown in broken lines in Figure 3, in a direction opposite that of the movement of the cam member 4 which is indicated by the arrow in Figure 3.

When the hook formation 31 engages the outer end of the spring member 19, the momentum of the camera mechanism and the driving force of the spring motor is immediately opposed by the initial tension of the spring member, the surplus momentum and driving force being cushioned by the yielding of the spring member.

The end of the segment portion 16 adjacent the outer portion 23 of the spring member forms a stop against excessive yield of the spring member, and the arrangement is preferably such that the outer portion 23 of the spring member just comes up to the adjacent end of the segment portion 16 when stopping the camera mechanism from its maximum speed.

Thus the camera mechanism is stopped positively within a relatively short predetermined range in the cycle of the cam member 4, the stop being adequately cushioned to prevent undue strain on the parts.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

I claim:

1. In a device of the character described the combination with a revoluble member having a hub, of a spring member having its inner portion coiled about said hub and having its inner end angularly engaged with said revoluble member and having its outer portion extending radially outward from said inner portion, and a stop member movable into and out of angular engagement with the outer portion of said spring member.

2. In a device of the character described the combination with a revoluble member having a hub, of a spring member having its inner portion coiled about said hub and having its inner end angularly engaged with said revoluble member and having its outer portion extending radially outward from said inner portion, a stop member movable into and out of angular engagement with the outer portion of said spring member, and an abutment on said revoluble member and engaging said radial portion of said spring member to maintain an initial tension thereon in the direction opposite that of the movement of said revoluble member.

3. In a device of the character described the combination with a revoluble member having a hub and a segmental portion extending about and spaced from said hub, of a spring member having its inner portion coiled about said hub and disposed between the same and said segmental portion and having its inner end turned radially outward and angularly engaging against said segmental portion and having its outer portion extending radially outward from its inner portion, and a stop member movable into and out of angular engagement with the outer portion of said spring member.

4. In a device of the character described the combination with a revoluble member having a central hub and a segmental portion extending about and adjacently spaced from said hub, of a spring member having its inner portion coiled about said hub and disposed between the same and said segmental portion and having its inner end turned radially outward and angularly engaging said segmental portion and having its outer portion extending radially outward from its inner portion, a stop member movable into and out of angular engagement with said outer portion of said spring member, and an abutment on said revoluble member and engaging said outer portion of said spring member to maintain an initial tension thereon in the direction opposite that of the movement of said revoluble member.

5. In a motion picture camera the combination with a revoluble member having a disk portion cut away at one face thereof to form a central hub and a segmental portion extending about and adjacently spaced from said hub portion, of a segmental exposure shutter disposed at said face and secured on said revoluble member, a spring member disposed in the space afforded by said cut away portion and having its inner end coiled about said hub and disposed between the same and said segmental portion and having its inner end turned radially outward and angularly engaging said segmental portion and having its outer portion extending radially outward from its inner portion, and a stop member movable into and out of angular engagement with the outer portion of said spring member.

6. In a motion picture camera the combination with a revoluble member having a disk portion cut away at one face thereof to form a central hub and a segmental portion extending about and adjacently spaced from said hub and having said hub extending axially outwardly beyond the plane of said face, of a centrally apertured exposure shutter engaged on said hub and disposed at said face and secured on said revoluble member, a spring member disposed in the space afforded by said cut away portion and having its inner portion coiled about said hub and disposed between the same and said segmental portion and having its inner end turned radially outward and angularly engaging said segmental portion and having its outer portion extending radially outward from its inner portion, a stop member movable into and out of angular engagement with the outer portion of said spring member, and an abutment stud secured on said revoluble member and extending across said space and engageable by said spring for maintaining an initial tension thereon.

ALBERT S. HOWELL.